Patented May 2, 1950

2,506,283

UNITED STATES PATENT OFFICE 2,506,283

PREPARATION OF ASPHALT COMPOSITIONS

Vaughn R. Smith, El Cerrito, and Charles G. Schmitz, Richmond, Calif., assignors to California Research Corporation, San Francisco, Calif., a corporation of Delaware No Drawing. Application May 13, 1946, Serial No. 669,468

9 Claims. (Cl. 106—273)

This invention relates to the manufacture and utilization of asphaltic materials, and particularly those in which a halogen containing polymerization-promoting metallic salt is used to produce an asphalt having the desired physical characteristics with a minimum of air blowing and which will not subsequently form a thick skin or scum upon continued heating just prior to the ultimate utilization of the asphaltic material.

Various processes have been developed for promoting the polymerization or oxidation of asphaltic materials to obtain products having improved physical characteristics, for example that described and claimed in the United States Patent No. 1,782,186, issued November 18, 1930 to Gene Abson. As described in that patent, the asphaltic materials in question are derived from petroleum residuum, and the term "residuum" used herein is intended to mean any residue of distillation which may be used in the production of asphalt. That process utilizes an inorganic metallic salt which is non-volatile at temperatures under which the asphaltic residuum material is blown with air but which is effective as a catalyst to promote the polymerization of certain components of the material to produce an asphalt having the desired physical properties.

It has been found that asphalts produced by such catalytic operations, after their manufacture has been completed and when they are again heated in the presence of air to temperatures of 300–450° F. for relatively extended periods of several hours duration prior to or during their utilization for impregnating fibrous materials, coating roofs and the like, will form a relatively thick scum or skin on the surface which interferes materially with the processes just mentioned. Certain asphalts which naturally or inherently contain polymerization-promoting agents are also somewhat susceptible to the effect just described.

It is an object of this invention to provide a method of preventing the formation of such scums or skins on asphalts of this kind, which normally contain a residue of the intentionally introduced or naturally occurring polymerization-promoting agent or material, by the addition of a small proportion of a basic metallic or alkaline earth oxide or hydroxide to the asphalt after the air blowing operation has been completed and prior to its ultimate utilization.

Another object is to provide an improved asphaltic product which will withstand heating in the presence of air at temperatures of from 300 to 450° F. without the formation of an objectionable hardened or thickened layer upon its upper surface which would interfere with its ultimate utilization or handling.

These and other objects of the invention will be more fully apparent from the following description of a preferred method of carrying out the invention together with the disclosure of preferred materials for producing the desired product.

As an example, in the preparation of an air blown asphalt having a melting point of 155/165 according to the Standard of American Society for Testing Materials D—36—26, which preparation involves the preliminary incorporation into the base stock of an effective amount up to about ½% of ferric chloride ($FeCl_3.6H_2O$), a small proportion, about 1% by weight, of calcium hydroxide ($Ca(OH)_2$) was incorporated into the material after the air blowing or polymerization period was completed. This material was then heated in air to a temperature of 450° F. for two hours without the formation of any thick layer or skin on its upper surface. Similarly produced asphalt without the addition of the basic hydroxide formed a layer approximately ⅛-inch thick of hardened material on its upper surface when heated to the same temperature for the same period of time. Similar results were obtained by the use of corresponding amounts of calcium oxide (CaO) or unslaked lime and magnesium oxide (MgO) and hydroxide ($Mg(OH)_2$). Further tests indicate that desirable results may be obtained with these materials in proportions ranging from an effective amount up to about 2% of the asphalt being treated.

An additional advantage of this invention is the improvement in the finished asphalt which reduces its tendency to corrode or cause unduly rapid deterioration of cotton or other cellulosic materials, for example mops and the like, which may be in contact with the heated product during its application to extended surfaces, such as roofs. In addition, improvements in the tensile strength of cotton fibres and the like after prolonged contact with the heated asphaltic products of this kind, particularly by the addition of calcium oxide, have been determined.

We claim:

1. In the preparation of an airblown polymerized asphalt containing a residue of polymerization-promoting metallic salts, the step of inhibiting undesirable scumming and hardening by said salts in the finished asphalt, which comprises incorporating with said finished asphalt a small amount, sufficient substantially to prevent said scumming and hardening, of a basic material selected from the group consisting of calcium and magnesium oxides and hydroxides.

2. The method of inhibiting scumming and hardening of catalytically airblown asphalt upon heating thereof during utilization or application, comprising the step of adding to said airblown asphalt, after airblowing and prior to utilization, an effective amount up to about 2%, substantially to prevent said scumming and hardening, of basic material selected from the group consisting of calcium and magnesium oxides and hydroxides.

3. The method of claim 2, wherein the basic material is calcium oxide.

4. The method of claim 2 wherein the basic material is calcium hydroxide.

5. The method of claim 2 wherein the basic material is magnesium oxide.

6. The method of claim 2 wherein the airblown asphalt is airblown residuum asphalt.

7. The method of claim 6 wherein the basic material is calcium oxide.

8. The method of claim 6 wherein the basic material is calcium hydroxide.

9. The method of claim 6 wherein the basic material is magnesium oxide.

VAUGHN R. SMITH.
CHARLES G. SCHMITZ.

REFERENCES CITED

The following references are of record in the file of this patent:

UNITED STATES PATENTS

| Number | Name | Date |
|---|---|---|
| 1,782,186 | Abson | Nov. 18, 1930 |
| 2,179,208 | Burk et al. | Nov. 7, 1939 |
| 2,282,703 | Burk | May 12, 1942 |
| 2,383,701 | Becker et al. | Aug. 28, 1945 |